3,113,455
FLUID DENSITY WELL LOGGING SONDE WITH TWO PACKING ELEMENTS MOUNTED ON ONE SHAFT
Raymond W. Sloan and Malcolm O. Johnson, Dallas, Tex., assignors to Socony Mobil Oil Company, Inc., a corporation of New York
Filed June 23, 1960, Ser. No. 38,315
3 Claims. (Cl. 73—155)

This invention relates to the measurement of characteristics of flowing fluids. More specifically, this invention relates to the measurement of characteristics of fluids flowing from a particular selected location in an earth formation into a borehole penetrating the earth formation.

It has been a well-known practice to measure the characteristics of fluids flowing into a wellbore penetrating the earth from defined strata adjacent to the wellbore. Numerous methods and forms of apparatus have been employed in carrying out such measurements. One approach to the problem of restricting the flow of fluids into the wellbore from a particular zone or segment of the earth's structure has been to employ packers for the purpose of excluding the fluids flowing from zones other than the one in question. These packers have usually been of the type which are either hydraulically actuated or are mechanically actuated from the surface. In both instances it is generally necessary that the packers be inserted into the well and lowered into the desired position by means of a string of tubing which extends from the surface to the location of the packers. The tubing functions to either conduct the hydraulic fluid necessary to set the packers or to serve as the mechanical link between the surface equipment and the packers to permit them to be set by the mechancial action of the tubing string. Such arrangements for packing-off selected zones within a wellbore have numerous disadvantages. An expensive operation is involved, requiring a drilling rig for the purpose of handling the necessary string of tubing, and the packers employed are not readily movable to other locations within the wellbore. Also, it is normally necessary that the well be killed or shut down during the operation of setting and retrieving the packers. Another disadvantage of the conventional types of packer arrangements for use in well testing is the fact that no means are provided to permit the fluids within the wellbore below the packer to by-pass the zone being tested. In other words, the packer must be set with sufficient force that the fluids within the wellbore below the packed-off zone will be contained below the lowermost packer and cannot flow through it during testing.

Another approach to the problem of measuring characteristics of fluids within a wellbore is the use of a continuous type logging tool with which no forms of packers are employed. Measurements may be made by this type of tool while it is being moved through the wellbore, or the tool may be stopped at selected locations within the wellbore for the purpose of taking the desired measurements. While this type of tool may be suspended from a cable and readily moved through the wellbore, it does have the disadvantage that the measurements taken with it must be corrected to compensate for the fact that the fluids flowing from any particular zone into the wellbore will be mixed with and contaminated by fluids flowing into the wellbore from other zones which are principally below the tool. Such procedure of correcting for fluids coming from zones other than the one in question yields an accuracy which decreases with the production from the other zones. The result is greater inaccuracies in characteristics of fluids from the upper zones which may well be the most oil productive zones.

It is an object of this invention to provide apparatus for measuring the characteristics of fluids flowing through a wellbore. It is another object of this invention to provide a well tool which may be employed to measure the characteristics of fluids flowing from selected locations within a wellbore without the necessity of using conventional forms of packers. It is a further object of this invention to provide a well tool which utilizes packers and a by-pass arrangement which will permit continuous flow of fluids in the wellbore while measuring the characteristics of fluids flowing from a selected zone into the wellbore. A still further object of the invention is to provide a tool capable of segregating and measuring the characteristics of continuously flowing fluids regardless of variations in wellbore diameter in the zones wherein segregation is effected. These and further objects of the invention will be evident from a reading of the following specification taken in conjunction with the accompanying drawings.

In accordance with the present invention, there is provided a system for obtaining a flow profile of formations which are penetrated by a borehole. The system comprises an exploring unit or well tool which is adapted to be moved along the length of the borehole. The unit has structure forming two longitudinally oriented flow channels, means for directing flow from below the unit through one of the flow channels, and means for directing flow from formations adjacent to the unit through the other of the flow channels  Associated with the second mentioned of the flow channels is measuring means for providing an indication of a characteristic of the fluids flowing through the flow channel. The term "characteristic" as used herein is intended to include properties and conditions of fluids, such as fluid density, fluid flow rate, fluid temperature, etc.

More particularly, in accordance with the present invention, there is provided apparatus for measuring characteristics of fluids flowing in a wellbore which comprises in combination an elongated, tubular housing or body structure having mounted thereon spaced-apart, flexible diaphragm type packer elements adapted to engage the walls of a wellbore for the purpose of isolating a selected zone within the wellbore. The tubular housing is provided with the necessary ports and fluid flow passages to permit separate flow of fluids through the tool from below the lowermost flexible diaphragm and from the zone defined between the flexible diaphragms, respectively. Fluid flow ports are provided below the lowermost flexible diaphragm and above the uppermost flexible diaphragm, interconnected by a first fluid flow passage to permit well fluids to enter the tool from below the lowermost diaphragm and flow through the tool to a point above the uppermost flexible diaphragm where the well fluids re-enter the wellbore. Fluid flow ports are also provided between the flexible diaphragms connecting into a second fluid flow passage which extends to a point above the uppermost flexible diaphragm, at which point the second fluid flow path is connected into fluid flow ports extending through the tubular housing to permit fluids to flow into the tool from between the flexible diaphragms and through the tool and back into the wellbore at a location above the uppermost flexible diaphragm. Means are provided in the body structure for measuring the characteristics of fluid flowing through the second fluid flow path.

Each packer element employed in the preferred embodiment of the invention comprises a flexible membrane supported on ribs or stays which are actuatable from a folded to an unfolded position by means of a motor which is contained within the tubular-shaped housing. The entire tool is suspended within a wellbore by means of a cable which functions to support the tool within the wellbore, convey power to the motor, and convey signals from the measuring system to the surface.

Referring to the drawings.

Figure 1:
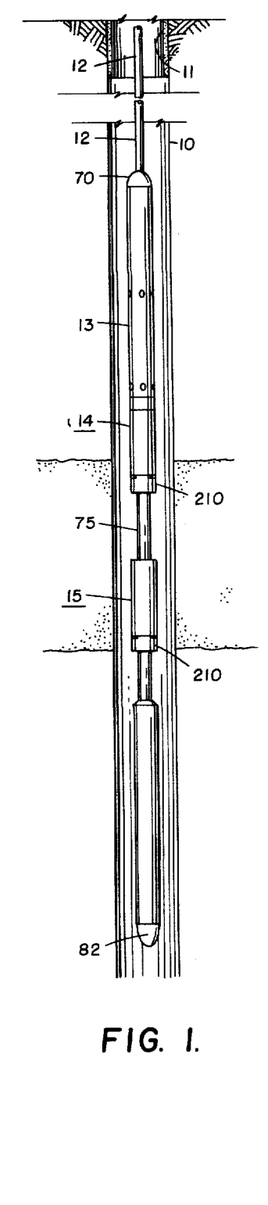
FIGURE 1 is a diagrammatic view in elevation illustrating a well tool constructed in accordance with the invention disposed in a wellbore and showing the packer elements in folded position.

FIGURES 1–4 shall be referred to as illustrating the major elements of a well tool constructed in accordance with the invention. In FIGURE 1, the lower end of a string of casing 10 is shown within a wellbore 11. The well tool is supported within the wellbore 11 by means of cable 12 which extends to the surface where it is connected to the necessary electrical and mechanical structure, not shown, required to carry out the desired operations with the tool. While the particular type of cable 12 which has been employed is an armored cable provided with a single lead, it is to be understood that the cable may be provided with two or more leads as desired or required by the electrical circuitry employed. By suspending the tool from a cable as shown, the tool may readily be introduced into the wellbore and removed from the wellbore and also moved from place to place within the wellbore for the purpose of taking the desired measurements. For purposes of the present general discussion of the invention as illustrated in FIGURES 1–4, the tubular housing of the tool will be referred to by the reference numeral 13 as denoting the over-all outer casing of the tool, though it will be recognized from a reading of the detailed description of the tool that outer casing 13 comprises a number of tubular members as required for functional and construction purposes.

Figure 2:
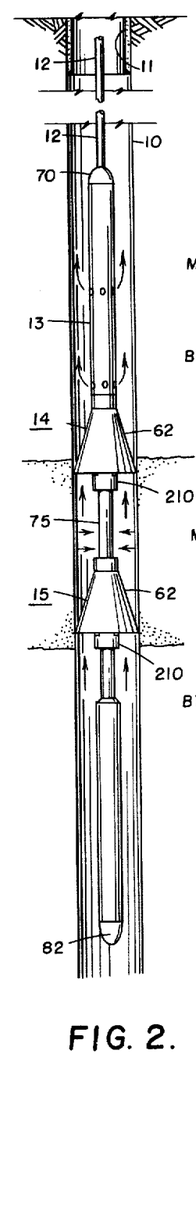
FIGURE 2 shows the tool of FIGURE 1 with the packer elements expanded into contact with the wall of a wellbore.
Figure 3:
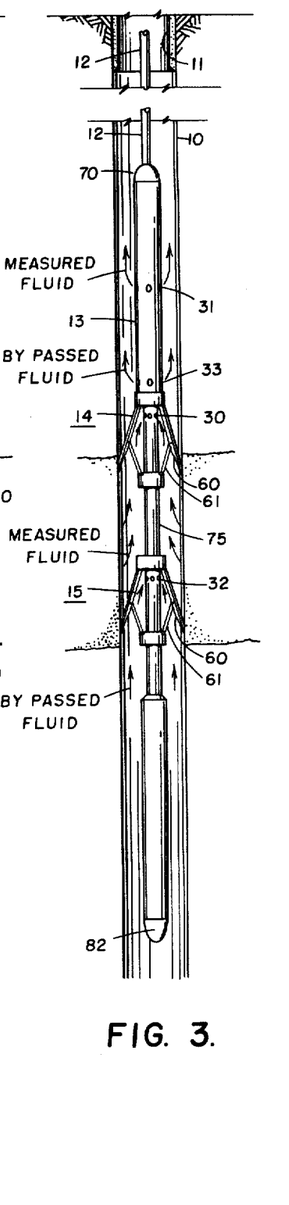
FIGURE 3 is similar to FIGURE 2 with the flexible membrane covering of the packer elements removed to show the supporting structure of the packer elements.
Figure 4:
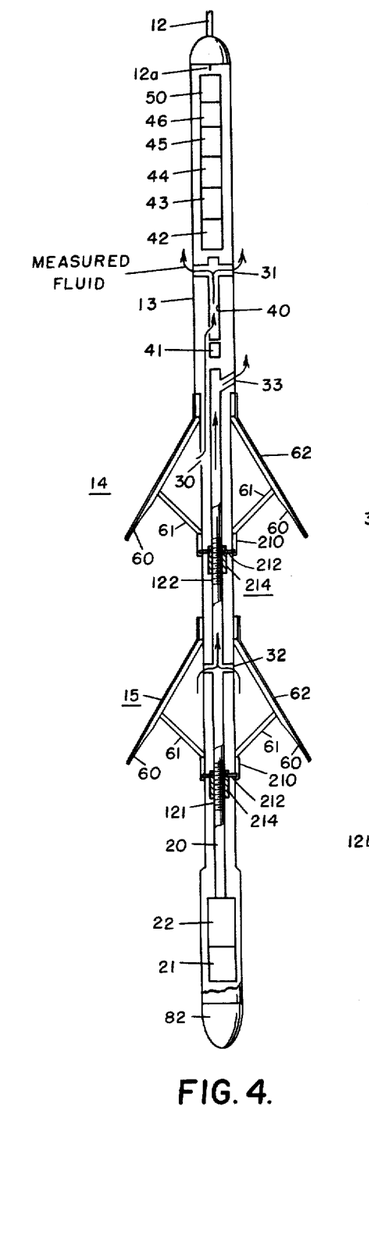
FIGURE 4 is a diagrammatic view in cross section of the well tool illustrating the inlet and outlet ports and the fluid flow paths through the tool.

Upper packer element 14 and lower packer element 15 are each secured to the housing 13 in such a manner that they may be moved from a completely retracted position, as shown in FIGURE 1, to a fully expanded position, as shown in FIGURES 2–4, by means of a hollow drive shaft 20, as shown in FIGURE 4, which is actuated by a motor 21 coupled through a gear box 22 located in the lower portion of the tool body. At times when the tool is being moved through the wellbore, the packer elements occupy the completely retracted position illustrated in FIGURE 1. When the tool is at a particular location where fluid measurements are to be taken, the packer elements are in expanded position, as illustrated in FIGURES 2–4. In the latter position, the packer elements are in contact with the wall of the wellbore, or if the well is cased with the internal surface of the casing, in order to provide a packed-off zone between the packer elements. That fluid which is actually measured by the tool, or, in other words, the fluid which actually flows through the measuring system of the tool, is the fluid flowing into the wellbore from the earth formation around the wellbore between the two expanded packers, as illustrated in FIGURES 2 and 3. The fluid being measured flows into the tool through ports 30 and emerges from the tool back into the wellbore through ports 31. The fluid within the wellbore below lower packer element 15 enters the tool through ports 32, flows through the tool within the hollow drive shaft 20, as best seen in FIGURE 4, and emerges from the tool back into the wellbore through ports 33. This latter fluid may be referred to as the by-passed fluid inasmuch as at no time during passage through the tool does it come in contact with the fluid which enters the tool between the packers and is being measured by the tool. The paths taken by the measured fluid and the by-passed fluid, and the fact that they at all times during their travel through the tool remain completely separate, may be best observed by examination of FIGURE 4.

Referring to FIGURE 4, the fluid which is being measured flows through the tool around drive shaft 20, and at a point above the upper terminus of the drive shaft the fluid enters a flow path 40 which extends between a radioactive source 41 and a crystal detector 42, the crystal detector being positioned above the point at which the fluid emerges from the tool through ports 31. Source 41 may be a gamma ray emitter. The attenuation or absorption of the radiation passing through the fluid in the flow path 40 is sensed by detector 42 to provide a measure of the density of the fluid. Crystal detector 42 is interconnected with a photomultiplier tube 43, an amplifier 44, a high voltage power supply 45, a battery pack 46, and a relay switching circuit 50 which provide the electrical function of conveying the measurements taken by the crystal detector 42 through the cable 12 to the surface. The battery pack 46 provides the electrical energy necessary to convey the measured signals from the tool to the surface through cable 12. The motor 21 which actuates the packer elements is provided with electrical power sent from the surface through cable 12 and connected into the motor through the switching circuit 50. The relay switching circuit 50 serves the function of providing the necessary electrical connection between the cable 12 and both the signal measuring system and the motor 21, as needed during the operation of the tool. During those times when measurements are being taken, the measuring system is connected with the cable 12 by means of the switching circuit 50. The switching circuit 50 is also utilized to disconnect the measuring system from the cable and to connect the motor 21 to the cable at such times as when it is necessary to either expand or retract the packer elements 14 and 15. More specific details with respect to the electrical circuitry employed will be described hereinafter.

The general arrangement of the packer elements 14 and 15 is shown in FIGURES 2–4. By the utilization of this particular form of packer actuated by the motor 21, housed within the tool itself, the tool is able to isolate any desired zone within the wellbore while at the same time being completely portable in nature such that it may be moved from zone to zone without withdrawal from the wellbore. The supporting structure of the packer elements 14 and 15 comprises a plurality of ribs 60, each of which is secured to a strut 61. All of the ribs 60 are pivotally secured at their upper ends in a fixed position around the tubular housing 13. The lower ends of each of the struts 61 are secured by means of pivot connections around the housing 13 to structure which is actuated relative to the housing by the hollow drive shaft 20. Rotation of the drive shaft 20 causes raising and lowering of the lower ends of struts 61 which effects expansion and retraction of the ribs 60 relative to the tool housing 13 in a manner very similar to the operation of a conventional type umbrella. The ribs 60 are covered with flexible, fluid-impervious diaphragms or membranes 62. The diaphragms 62 are affixed along the outer surfaces of the ribs and are secured at their upper ends around the tool housing 13 so that when the outer, lower ends of the diaphragms are expanded into contact with the walls of a wellbore, fluid-tight seals are effected between the walls of the wellbore and the tool housing by each of the packer elements. The fluid-tight seals thus formed cause the well fluids below the lower packer element 15 to flow through a first fluid flow passage in the tool and back into the wellbore above the upper packer 14, while the fluids in the wellbore between the packer elements are caused to flow through a second fluid flow passage provided with a measuring system and outwardly into the wellbore.

A particularly unique feature of the packers employed with the invention is the ability of the packers to be operated independently of each other in the event an obstruction is encountered by one of the packers or one of the packers is in a portion of the wellbore which is of a diameter different from the portion of the wellbore in which the other packer is located. For example, if lower packer 15 encounters an obstruction during expansion into contact with the wellbore wall, the other packer will continue to expand until it has contacted the wall of the wellbore. The structure which permits this unique operation of the packers independently of each other will be described in connection with the detailed description of the tool.

Detailed features of the tool are shown in FIGURES 5–16. Referring to FIGURES 5, 9, 12, and 16, the outer casing 13 of the tool comprises the following elements: a tubular-shaped head portion 70 which is secured to the cable 12; a tubular member 71 which houses the necessary electrical apparatus, including the crystal detector; a tubular member 72 containing the radioactive source 41 and the flow path 40 through which the fluid in question is measured; a connecting member 73; a tubular member 74; a portion 75 on which is mounted the packer elements 14 and 15 and which is of reduced diameter to permit the packer elements to be retracted to an external diameter no greater than the diameter of the rest of the tool; a tubular member 80 which houses the motor 21 and the gear box 22; and a bullet-shaped end member 82. In lieu of the bullet-shaped end member 82, an element generally known as a centralizer may be secured to the lower end of the tool for the purpose of maintaining the tool at a central location within the wellbore or, in other words, along the center line of the wellbore. Such centralizers are well known in the well tool art and generally are provided with resilient, springlike feelers which contact the surfaces of the wellbore to assist in maintaining the tool in the desired central location within the wellbore.

Figure 16:
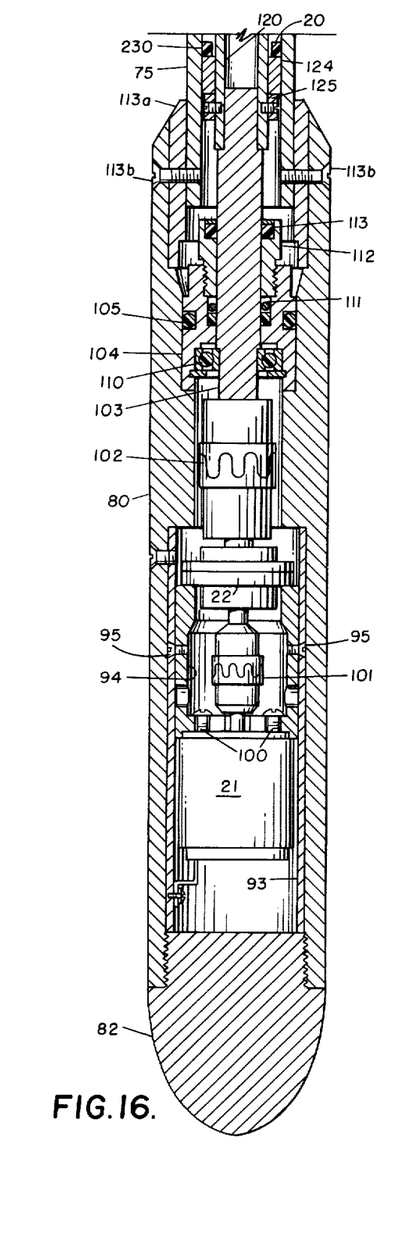
FIGURE 16 is a view in cross section showing the lower portion of the well tool.

Referring to FIGURE 16, secured within member 80 is a hollow, tubular-shaped motor chassis 93, inside of which are secured the motor 21 and gear box 22. By removal of member 82 from member 80, the motor chassis 93 may readily be taken out of the tool for repair and replacement of the motor and gear box. An adapter 94 is positioned within the chassis 93 and secured to the chassis by means of a plurality of screws 95. The motor 21 is secured to the adapter 94 by means of screws 100. Connected between the motor 21 and the gear box 22 is a coupling 101 which extends from the shaft of the motor to the input drive of the gear box. Gear box 22, in one particular model of the tool, is an integral planetary gear reducer with a servo type mounting. The output shaft of the gear box 22 is connected to a coupling 102 which in turn is secured to a short shaft member 103. Positioned around shaft 103 within member 80 is a packing gland and bearing support member 104. A fluid-tight seal is provided around member 104 within member 80 by means of an O-ring 105. Within member 104 around the shaft 103 is a ball bearing unit 110 which is designed for both the radial and axial loads on the shaft. Also positioned within member 104 are gaskets 111 which are held in place by a nut 112 to effect a fluid-tight seal around the shaft 103. An additional seal around the shaft is provided by means of the gasket 113 contained within the nut 112.

Figure 9:
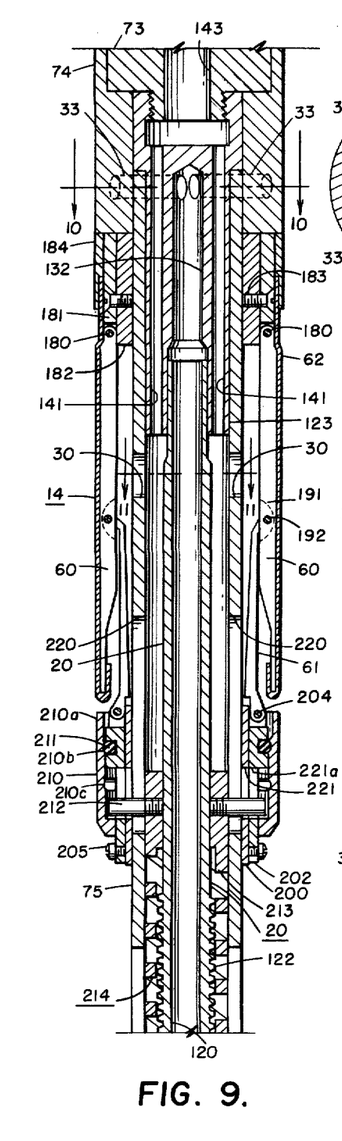
FIGURE 9 is a cross-sectional view of the upper central portion of the tool illustrating the upper packer element in folded position.
Figures 10, 11, 12, 13:
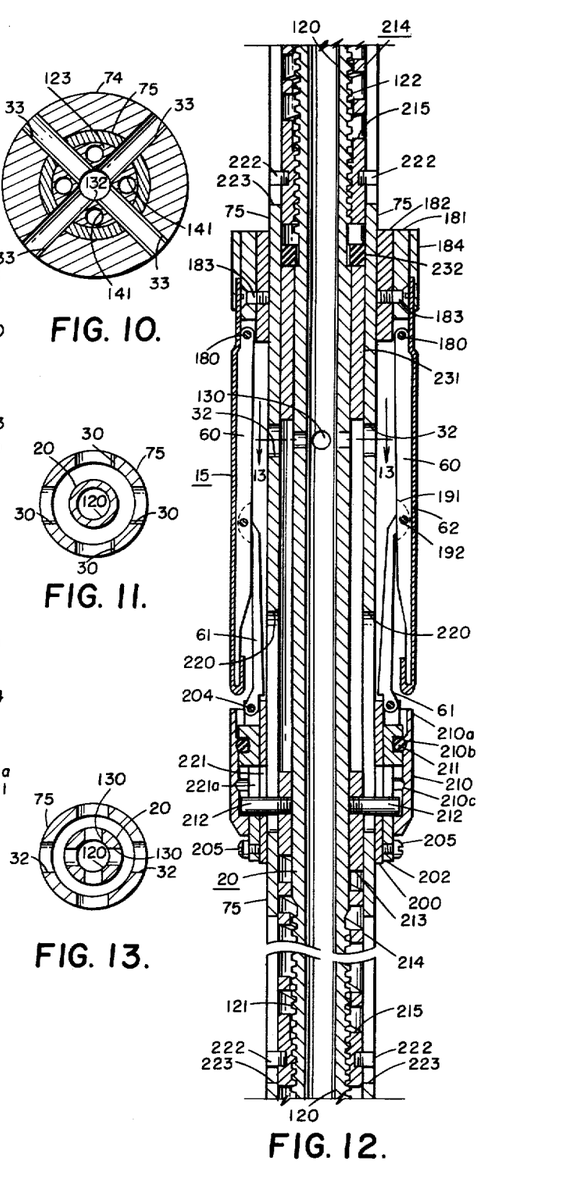
FIGURE 10 is a view in cross section taken along the line 10—10 of FIGURE 9.
FIGURE 11 is a view in cross section taken along the line 11—11 of FIGURE 9.
FIGURE 12 is a cross-sectional view of the lower central portion of the well tool illustrating the lower packer element in folded position.
FIGURE 13 is a view in cross section taken along the line 13—13 of FIGURE 12.
Figure 14:
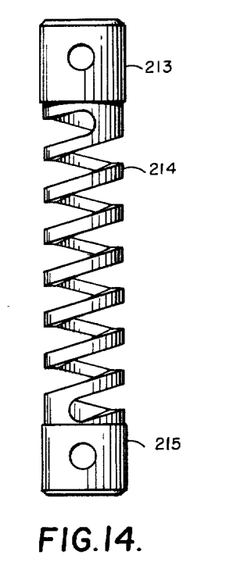
FIGURE 14 is a plan view of the spring-type actuating member employed in association with the actuating mechanisms for the upper and lower packer elements.
Figure 15:
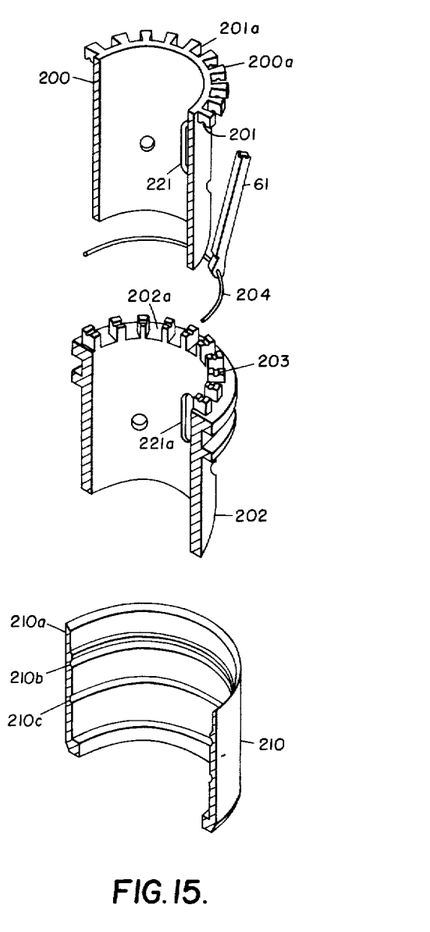
FIGURE 15 is a sectional, exploded view in perspective illustrating the supporting structure for the struts employed in the upper and lower packer elements.

Member 75 is secured into member 80 by means of a sleeve 113a which is secured within the upper end of the member 80 by screws 113b. Positioned within the member 75 is hollow drive shaft 20 which is connected at its lower end to the shaft 103 in order that the drive shaft may be rotated by the motor 21. The hollow drive shaft 20 performs the dual function of conducting the by-passed fluids through the tool and providing the driving link between the motor and the packer elements. Provided within drive shaft 20 is an internal bore or fluid flow path 120 through which the by-passed fluids flow through the tool. Referring to FIGURES 9 and 12, formed along the outer surface of drive shaft 20 are screw threads 121, which serve to drive the expanding and contracting mechanism for lower packer element 15, and screw threads 122, which serve to drive the expanding and contracting mechanism for upper packer element 14. As shown in FIGURE 9, drive shaft 20 is journaled at its upper end into a flow control member 123 and is supported near its lower end by a bearing 124, shown in FIGURE 16, which is affixed within and to member 75. A collar 125, shown in FIGURE 16, is secured around shaft 20 immediately below the bearing 124 to assist in preventing uphole drift of the shaft 20 during the closing of the packer elements.

A plurality of ports 130, shown in FIGURE 12, are provided in the shaft 20 at a location between the threaded sections 121 and 122 and immediately below the point at wihch the upper end of the lower packer element 15 is secured to the member 75. Substanitally in line with the ports 130 within shaft 20, member 75 is provided with a plurality of ports 32 in order that the fluids by-passed by the tool may gain entry below the lower packer 15. These by-passed fluids flow into member 75 through ports 32 and from there through ports 130 into flow passage 120 within shaft 20. The by-passed fluids flow upwardly through passage 120 into passage 132 which is provided in member 123, as shown in FIGURE 9. The by-passed fluids then flow from passage 132 outwardly back into the wellbore through fluid ports 33 which extend from passage 132 through members 123, 75, and 74 at a location above the point where the upper end of membrane 62 is secured to the member 74. Thus, there is provided means for flowing fluids, the characteristics of which are not to be measured by the tool, into the tool at a point below the lower packer 15, through the tool, and outwardly back into the wellbore at a point above the upper packer 14. The ports 33 are radially positioned, extending outwardly from passage 132 and, as illustrated in FIGURE 10, are four in number, though it will be understood that any number of ports satisfactory to handle the quantity of by-passed fluids may be employed.

Figures 5, 6, 7, 8:
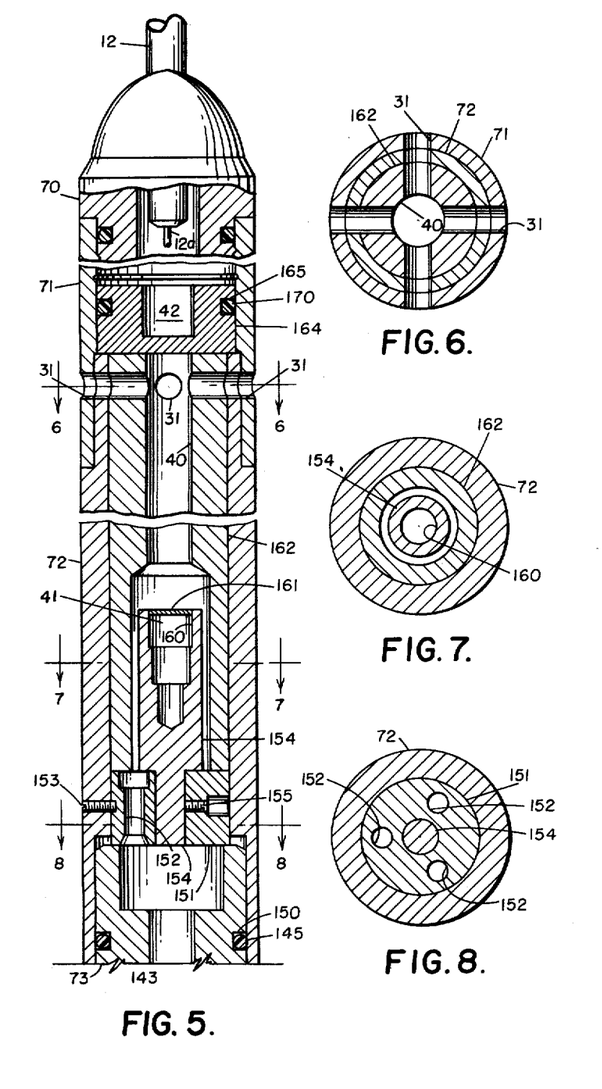
FIGURE 5 is a view in cross section of the upper portion of the tool.
FIGURE 6 is a view in cross section taken along the line 6—6 of FIGURE 5.
FIGURE 7 is a view in cross section taken along the line 7—7 of FIGURE 5.
FIGURE 8 is a view in cross section taken along the line 8—8 of FIGURE 5.

The fluids which are confined within the wellbore between the packer elements when they are expanded into engagement with the walls of the wellbore, and whose characteristics are to be measured by the tool, flow into the annular space between member 75 and shaft 20 through ports 30 which are provided in member 75 below the point of connection of the upper end of the upper packer 14. These fluids then flow upwardly through a plurality of longitudinally disposed flow passages 141 provided within member 123. The flow passages 141 are so positioned within the member 123 that they pass between fluid ports 33, as best illustrated in the cross-sectional view shown in FIGURE 10. Fluid flow passage 143 extends through member 73 to provide a path for the measured fluids flowing from passages 141. O-ring 145, shown in FIGURE 5, is positioned in slot 150 formed in member 73 to effect a fluid-tight seal between the members 72 and 73. Positioned within member 72 at the upper end of member 73 is a mounting plate 151 which is provided with a plurality of longitudinally extending fluid flow passages 152 which receive the measured fluid from flow passage 143. The mounting plate 151 is held in position within member 72 by means of a set screw 153.

Secured to mounting plate 151 is a radioactive source holder 154 which is held in position by set screw 155. The radioactive source holder 154 contains a cylindrical-shaped chamber 160 which is adapted to hold the radioactive source 41. The upper end of the source holder 154 at 161 is relatively thin in order that the radiation emitted by the radioactive source may readily escape from the source holder. The radioactive source holder 154 may be constructed of stainless steel. Member 72 is provided with a shielding liner 162 which is provided with longitudinally extending fluid flow passage 40 which is enlarged at its lower end, that is, the end of the liner which fits around the source holder 154. The enlarged portion of flow passage 40 is of sufficient diameter that an annular space will be provided within the flow passage around source holder 154 in order that the measured fluids may flow from passages 152 in the mounting plate 151, around the source holder into the flow passage 40. At the upper end of liner 162 are a plurality of radial ports 31 which extend through members 71 and 72 to permit the measured fluids to flow from the flow passage 40 back into the wellbore. Liner 162 is preferably constructed of lead to provide a shielded path for the radioactive radiation. Positioned at the upper end of liner 162 within member 71 is a plug 164 which is provided with a groove 165 in which is fitted an O-ring seal 170 to prevent fluid leakage beyond the plug into the member 71 which contains the measuring apparatus of the tool.

Crystal detector 42 is mounted within the member 71 adjacent to the plug 164. Thus, the fluids whose characteristics are to be measured enter the tool through ports 30 below the upper packer 14 and flow through the various previously described passages around the source holder 154, through passage 40, and exit from the tool through radial ports 31. During its flow through the shielded passage 40, the fluid is subjected to radiation by the source 41 and the rate of the radiation passing through the fluid is detected by the crystal detector 42 to provide a measure of the density of the fluid. With the arrangement of ports and passages provided in the tool, the fluids within the wellbore below lower packer element 15 readily flow through the tool and outwardly into the wellbore above the upper packer 14, while those fluids confined within the wellbore between the packer elements flow through a separate passage in which they are subjected to radiation from a radioactive source to provide a measure of their density; and from this latter passage the fluids whose density are being measured again flow back into the wellbore.

The novel form of packer elements provided by the tool are motivated by the power source contained within the tool itself and are so constructed that they may operate independently of each other in order to compensate for variations in the diameter of the wellbore.

Figure 18:
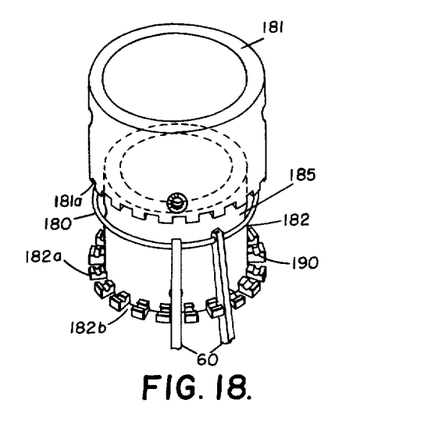
FIGURE 18 is an exploded perspective view showing the means for securing the upper ends of the ribs of the packer elements of the tool.

Each of the packer elements is covered with a membrane 62 which is substantially in the form of a truncated cone formed of a flexible, fluid-impervious material, such as rubber or a suitable plastic, which is molded to the external surfaces of the ribs 60. The structure for securing the upper ends of ribs 60, shown in FIGURE 18, is very similar to that shown in FIGURE 15. Referring specifically to the lower packer element 15, as shown in FIGURE 12, the upper ends of the ribs 60 are each pivotally secured to a ring 180 which is held between external cylindrical hinge member 181 and internal cylindrical hinge member 182, the latter two members being fitted together in telescope fashion and secured around the external surface of member 75 in a fixed position by means of screws 183. The cylindrical-shaped cover 184 is fixed over external hinge member 181 to provide a cover around the upper or apex end of membrane 62. As shown in FIGURE 18, the lower end of outer hinge member 181 is provided with a plurality of slots 181a into which the upper ends of the ribs 60 fit. The lower end of inner hinge member 182 is provided with an externally extending flange 182a which is provided with slots 182b which are identical in number and spacing to the slots 181a on the lower end of outer hinge member 181. The lower end of outer hinge member 181 is provided with a groove 185 adapted to cooperate with a groove 190 provided on the upper surface of the outwardly extending flange 182a on the lower end of inner hinge member 182 for the purpose of holding in position the ring 180 on which the upper ends of the ribs 60 are threaded. By means of the just-described assembly, the upper ends of each of the packer elements are held in a fixed position around the member 75.

Secured to each of the ribs 60 is a strut 61 which is held at its upper end to the rib in a slot 191 provided in the rib by means of a pin 192. Upward movement of the struts effects outward movement of the ribs by virtue of the pivotal connection of the upper end of each of the ribs. The lower ends of the ribs, of course, are free to move outwardly into contact with the wall of a wellbore to effect a seal between the wall of the wellbore and the flexible membranes 62. The lower ends of the struts 61 are each secured pivotally to a sliding assembly somewhat similar in construction to the assembly to which the upper ends of the ribs 60 are secured. The securing structure for the struts, which is in form of a slidable sleeve, may best be seen in FIGURE 15. An inner hinge member 200 is fitted in sliding relation around member 75. The upper end of inner hinge member 200 is constructed in the form of an outwardly extending flange 200a which is provided on its lower surface with a slot 201. The outwardly extending flange 200a of hinge member 200 is provided with a plurality of slots 201a to receive the lower ends of the struts 61. Fitted around hinge member 200 is an external hinge member 202 which is provided in its upper end with a plurality of slots 202a and a groove 203, adapted to cooperate with the groove 201 on the inner hinge member 200 to hold a ring 204 onto which the lower ends of the struts 61 are threaded. Screws 205 are engaged in member 202, as shown in FIGURE 12. Fitted in sliding relationship around outer hinge member 202 is a sheath 210. Screws 205 function to prevent sheath 210 from sliding off the lower end of member 202. Between outer hinge member 202 and sheath 210 is an O-ring retainer 211. The upper end of sheath 210 is in the form of a relatively thin flange 210a which fits over the lower ends of the ribs 60 to hold the ribs in a full, inward or retracted position during introduction of the tool into a wellbore. This prevents the lower ends of the ribs becoming caught on obstructions in the wellbore during the lowering of the tool. Sheath 210 is provided with internal grooves 210b and 210c. When the sheath is in its uppermost position to hold the ends of ribs 60 inward, groove 210c is engaged by O-ring 211. When the sheath is retracted downwardly to free ribs 60, as shown in FIGURE 12, groove 210b is engaged by the O-ring, as illustrated. The first step in the expansion of the packer elements is the retraction of the sheath 210 away from the ends of the ribs 60 in order to free the ribs for expansion.

The assembly to which the lower ends of the struts 61 are secured is actuated longitudinally relative to the member 75 by means of the pins 212. The inward ends of pins 212 are secured into upper sleeve portion 213 of integral spring unit 214, the lower ends of which are an internally threaded nut portion 215. The pins 212 extend outwardly through the longitudinal slots 220 formed in member 75 and through slots 221 and 221a provided through the inner and outer hinge members 200 and 202, respectively. The outer ends of the pins 212 extend into the sleeve 210. The length of slots 220 is determined by the distance of travel required by the pins 212 to actuate the packer elements from a closed to a full-open position and return. The spring units 214, in association with the pins 212, provide the mechanical linkage between the drive shaft 20 and the actuating assemblies for the packer elements to permit rotation of the drive shaft to effect opening and closing of the packer elements. The internally threaded lower nut portions 215 of the spring units engage the threaded portions 121 and 122 of the drive shaft in order that rotation of the drive shaft will move the spring units longitudinally relative to the drive shaft. The spring unit which actuates lower packer element 15 is threadedly engaged with section 121 of the drive shaft, a shown in FIGURE 12, while the spring unit which actuates the upper packer element 14 is threadedly engaged to section 122 of the drive shaft, as shown in FIGURE 9. To prevent rotation of the spring units with shaft 20 in order that the drive shaft will actuate the spring units along the threaded portions thereof, the spring units are prevented from rotating by means of pins 222 which are secured at their inward ends into portions 215 of the spring units and extend outwardly through slots 223 provided in member 75. The length of the slots 223 is determined by the travel distance required for the spring units to move the packer elements from full-closed position to a full-open position and return.

While a detailed description has been given of lower packer element 15, it is to be understood that such description applies equally to upper packer element 14, shown in FIGURE 9, which employes identical parts which have been referred to by identical reference numerals.

Positioned around the shaft 20 on the upper surface of bearing 124 is a shock absorber ring 230, as shown in FIGURE 16, which functions to prevent direct contact between the lower end of the lower spring unit and the bearing 124. This shock absorber ring may be formed of rubber or any suitable plastic material. Secured around drive shaft 20 above ports 130 is a guide and bearing member 231, illustrated in FIGURE 12, which functions both as a guide and as a bearing for the drive shaft and secondarily serves as a seal to prevent the migration of the by-passed fluids upwardly along the drive shaft between the drive shaft and the member 75. As has been previously explained, the fluids which are by-passed by the tool, that is, those fluids whose density is not measured, flow into the tool below the lower packer, through the ports 32 in member 75, and into the internal bores or flow channel 120 of the hollow drive shaft 20. Positioned on the upper end of member 231 is a shock absorber ring 232 which functions to prevent direct metal-to-metal contact between the spring unit 214 associated with the upper packer element and the upper end of the guide 231.

In making the tool ready for introduction into a wellbore, the packer elements are adjusted in a fully retracted position with the sheath members 210 in a fully upward position in order that the upper ends 210a of the sheath members will overlap and engage the lower ends of ribs 60 to protect the ribs from engagement with any obstructions which may be in the borehole during introduction of the tool into the borehole to the point where a fluid density measurement is to be taken. When the packer elements and the sheath members are in this position, the pins 212 will be at the upper ends of the slots 221 and in engagement with the lower internal shoulder within the sheath 210. When the tool has arrived at the desired location within the wellbore where the packer elements are to be expanded, the drive shaft 20 is rotated by means of motor 21 in a direction which will cause the spring units 214 to move downwardly to cause the sheath members 210 to be pulled away from the ribs 60 in order to free the lower ends of the ribs so that the packer elements may be expanded. The slots 221 and 221a are of sufficient length that the pins 212 may be moved downwardly enough to effect this arrangement of the sheath members without effecting any downward movement of the actuating assemblies inasmuch as the actuating assemblies are already in their lowermost position due to the fully retracted position of the struts 61 and ribs 60. With the sheath members disengaged from the ends of the ribs, the motor 21 is reversed in order that the shaft 20 will drive the spring units in an upward direction to effect expansion of the packer elements. As the spring units move upwardly, the pins 212 engage the upper ends of the slots 221 and 221a, causing the actuating assemblies to be pushed in an upward direction. Pushing the actuating assemblies in an upward direction causes the struts 61 to push the ribs 60 outwardly to effect contact of the packer elements with the walls of the wellbore.

A particular feature of the invention is the ability of the packer elements to operate independently in the event that either of the packer elements encounters an obstruction or a portion of the wellbore which is of lesser diameter than the portion of the wellbore being contacted by the other packer. This particular feature of the invention is provided by the employment of the spring units 214. These spring units are so designed that the spring portion of the units will not undergo any appreciable compression during those times when the packer elements are not encountered obstructions. Should, however, one of the packer elements encounter an obstruction or a section of the wellbore of lesser diameter, the shaft 20 may continue to rotate with the particular spring unit associated with the packer element encountering the obstruction undergoing compression and, consequently, contracting, while the other spring unit associated with the normally operating packer will continue to drive the packer into sealed relationship with the wellbore walls. If the units 214 were solid rather than being provided with a spring section, any obstruction encountered by either of the packer elements would cause the drive shaft to be locked and thus prevent further expansion of the packer element which had not encountered an obstruction. Thus, the ability of the units 214 to compress independently permits a degree of independent operation of the packer elements. Once the desired measurements have been taken at a particular location within a wellbore, the direction of rotation of the shaft 20 is again reversed, causing the spring units 214 to be driven downwardly along the drive shaft, effecting retraction of the packer elements into the body of the tool.

The operation or control of the motor 21 and the circuits necessary to conduct measuring operations may be accomplished in any suitable manner. However, it is preferred in using the single lead cable 12 provided with a single conductor 12a to employ the control circuit illustrated in FIGURE 17.

Figure 17:
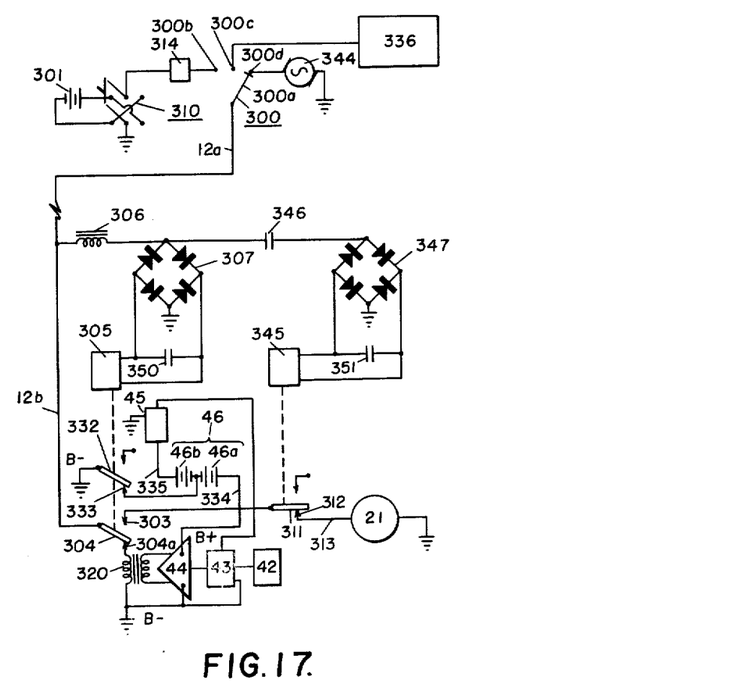
FIGURE 17 illustrates one form of electrical circuitry employed to carry out the operation of the packer elements and the measuring function of the tool.

Assuming that the logging tool has been located in a desired position in the wellbore opposite a zone to be tested, the movable contact 300a of switch 300 will be moved from its illustrated position to engage fixed contact 300b to apply the output of regulated D.C. supply represented by battery 301 to energize motor 21 to begin the opening of the packers 14 and 15. The output of the battery 301 is applied to the motor 21 by way of relay contacts 303 and 304. The contacts 303 and 304 are closed upon energization of relay coil 305 which is operative upon application of the closure of switch 300 with contact 300a (or as soon at D.C. is applied to conductor 12a). More particularly, the direct current energy is applied by way of a choke 306 and full wave rectifier 307 to the relay coil 305. With the operation of relay 305, the circuit from battery 301 to motor 21 may be from the one side of battery 301 to double-pole, double-throw switch 310, conductor 12a, relay contacts 303 and 304, relay contacts 311 and 312, conductor 313, motor 21, and thence to ground.

As the packers 14 and 15 engage the side walls of the wellbore or casing to establish a substantially fluid-tight barrier, the load upon motor 21 will begin to increase. When the load, as reflected by the current drawn by the motor, reaches a predetermined value signifying that the barrier has been effected, meter relay 314 responds to disconnect the battery 301 from the line.

The meter relay may be of any one of several types available commercially and well known to anyone skilled in the art.

With the tool now in place and the packers full open, the movable contact of switch 300 will be moved to the second position as represented by fixed contact 300c. Relay coil 305 will be de-energized with removal of direct current from the line and movable contact 304 will now engage fixed contact 304a to connect the output of transformer 320 to the conductor 12a. At the same time, power is supplied to both amplifier 43 and the high voltage power supply 45 for the photomultiplier tube 43. The battery pack 46, represented by batteries 46a and 46b, has a common ground circuit, including relay contacts 332 and 333. When the contacts are closed, power is supplied amplifier 44 from battery 46a by way of conductor 334. Similarly, power is supplied from battery 46b to the high voltage power supply 45 by way of conductor 335.

With the various elements energized, the measuring function may be performed wherein the output of the detector 42 and photomultiplier tube 43 is amplified by amplifier 44 and applied uphole through conductor 12a to recorder 336 by way of transformer 320 and contacts 304 and 304a. Recorder 336 registers the measurements taken relative to the depth at which they are taken.

Now that the measuring function has been performed, it will be desired to relocate the tool for further measurement. This will be simply accomplished by applying a direct current of polarity reversed with respect to that previously supplied to cause the motor 21 to rotate in an opposite direction to close the packers. The reversal of polarity may be readily accomplished by the double-pole, double-throw switch 310 and the application of D.C. once more to the cable or conductor 12a by moving contact 300a to engage contact 300b. As before, a fraction of the direct current will be applied to the coil 305 by way of the choke 306 and full wave rectifier 307. The motor 21 will be actuated by a direct current supply from battery 301 which may be traced again by way of switch 300, conductor or cable 12a, conductor 12b, relay contacts 303, 304, relay contacts 311 and 312, conductor 313, motor 21, and thence to ground. When the packers 14 and 15 have been fully closed, the motor again will tend to become overdriven or overloaded, causing the meter relay 314 to respond to disconnect the battery 301 from the line. The packers have now been fully closed; the tool is in a condition for relocation or repositioning within the wellbore. The new location for the tool may be some distance from the previous location and it is, therefore, desirable for the amplifier and the high voltage power supplier to be cut off in order to avoid running down the batteries 46a and 46b. This is desirable at all times when the measurements are not being made, for example, when the tool is initially introduced in to the borehole or when the tool is coming out. To this end, a third position 300d is provided on the switch 300 for applying an alternating current signal downhole over conductor 12a for disconnecting the batteries 46a, 46b and for disconnecting the motor 21. The latter is accomplished in order to avoid the application of alternating current to the motor 21 for the prolonging periods that may be necessary for the repositioning of the tool.

The disconnection of the batteries and of the motor is accomplished by energization of the relays represented by relay coils 305 and 345. The A.C. signal is applied by way of choke 306 to the full wave rectifier 307. The output of the rectifier, a rippling D.C., is applied to the coil 305 to back up movable contacts 304 and 332. Immediately with the breaking of their ground circuit, batteries 46a and 46b are disconnected from any load. A.C., from the source 344, is applied by way of condenser 346 to the full wave rectifier 347. The output of the rectifier 347, a rippling D.C., is applied to the coil 345 to pick up contact 311 and break the circuit to the motor 21. With the continued application of A.C. to the conductor 12a, the batteries remain disconnected and the motor is inoperable.

Condensers 350 and 351 are provided across the output of rectifiers 307 and 347 to provide a filter to prevent chattering of the relays.

The tool having now been positioned at a new location will again be made ready for a measuring function by movement of the movable contact of switch 300 to engage fixed contact 300b. The application once more of direct current to the conductor 12a will begin the opening of the packers 14 and 15 in the manner above described.

A series condenser may be provided in the secondary of transformer 320 to prevent the application of direct current thereto for the brief period preceding the operation of relay 305.

All of the electrical apparatus and circuitry above described are physically located within the tool housing except the following: D.C. power source 301, switch 300, switch 314, switch 310, recorder 336, and A.C. power supply 344. The electrical apparatus positioned within the tool, except motor 21 and its connecting lead 313, are in the upper portion of the tool, as indicated in FIGURE 4. A typical battery pack 46 which has been employed comprises long-like mercury cell batteries, each having 1000 milliampere capacity.

While the tool has been described as particularly adapted to make fluid density measurements within a borehole, it will be recognized that other fluid characteristcis and conditions may be determined with the tool. For example, a flow rate measuring system as disclosed in U.S. Patent 2,936,614, issued to John K. Godbey on May 17, 1960, may be incorporated into the second flow channel of the apparatus of the invention.

What is claimed is:

1. In a well logging tool for measuring characteristics of fluids flowing in a wellbore wherein there is provided elongated body structure, a pair of packer elements secured on said body structure and spaced apart one from the other, said packer elements being formed of flexible membranes supported on ribs actuatable between folded and unfolded positions by a common shaft connected to a motor housed in said body structure, a fluid flow passage extending through said body structure from between said packer elements to above the uppermost of said packer elements, and means associated with said fluid flow passage for measuring a characteristic of fluids flowing through said flow passage, the improvement in said tool which comprises a deformable element connected between said shaft and each of said packer elements to permit said shaft to continue rotation to actuate either of said packer elements in the event the other of said packer elements is rendered immobile.

2. The apparatus of claim 1 wherein each of said deformable elements comprises a springlike member threadedly engaged on said shaft at one end thereof and connected at the other end to means secured to said ribs.

3. In a well logging tool for measuring characteristics of fluids flowing in a wellbore wherein there is provided elongated body structure, a pair of packer elements secured on said body structure and spaced apart one from the other, said packer elements being formed of flexible membranes supported on ribs actuatable between folded and unfolded positions by a common shaft connected to a motor housed in said body structure, a first fluid flow passage extending through said body structure from below the lowermost of said packer elements to above the uppermost of said packer elements, a second fluid flow passage extending through said body structure from between said packer elements to above the uppermost of said packer elements, and means associated with said second fluid flow passage for measuring a characteristic of fluids flowing through said second fluid flow passage, the improvement in said tool which comprises a fluid flow passage through a portion of the length of said common shaft defining said first fluid flow passage through said tool and deformable elements for actuating said packer elements, each of said deformable elements comprising a spring threadedly engaged at one end to said shaft and secured at the other end to connecting means attached to said ribs on one of said packer elements, said deformable elements being slidably interconnected to said body structure to prevent rotation of said deformable elements relative to said body structure during rotation of said shaft whereby said deformable elements are caused to be moved along the length of said shaft upon rotation of said shaft.

References Cited in the file of this patent
UNITED STATES PATENTS

| | | |
|---|---|---|
| 2,929,455 | Godbey | Mar. 22, 1960 |
| 2,954,471 | Piety | Sept. 27, 1960 |
| 2,965,753 | Reynolds et al. | Dec. 20, 1960 |

UNITED STATES PATENT OFFICE
CERTIFICATE OF CORRECTION

Patent No. 3,113,455                          December 10, 1963

Raymond W. Sloan et al.

It is hereby certified that error appears in the above numbered patent requiring correction and that the said Letters Patent should read as corrected below.

Column 6, line 59, for "Substanitally" read -- Substantially --; column 9, line 41, for "a" read -- as --; line 58, for "employes" read -- employs --; column 10, line 2, for "bores" read -- bore --; lines 29 and 30, for "arrangement" read -- disengagement --; line 55, for "encountered" read -- encountering --; column 11, line 20, for "at" read -- as --; column 12, line 17, for "in to" read -- into --; line 61, for "long-like" read -- long-life --; line 64, for "characteristcis" read -- characteristics --.

Signed and sealed this 20th day of October 1964.

(SEAL)
Attest:

ERNEST W. SWIDER
Attesting Officer

EDWARD J. BRENNER
Commissioner of Patents